US012786531B2

(12) United States Patent
Yasunaga et al.

(10) Patent No.: US 12,786,531 B2
(45) Date of Patent: Nov. 3, 2026

(54) IMAGING APPARATUS

(71) Applicant: Panasonic Intellectual Property Management Co., Ltd., Osaka (JP)

(72) Inventors: Masakazu Yasunaga, Osaka (JP); Kenji Kusunoki, Osaka (JP); Yujiro Kitagawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 29 days.

(21) Appl. No.: 18/518,501

(22) Filed: Nov. 23, 2023

(65) Prior Publication Data

US 2024/0179385 A1 May 30, 2024

(30) Foreign Application Priority Data

Nov. 24, 2022 (JP) ................................ 2022-187323

(51) Int. Cl.
*H04N 23/51* (2023.01)
*H01Q 1/22* (2006.01)
*H04N 23/55* (2023.01)

(52) U.S. Cl.
CPC ............... *H04N 23/51* (2023.01); *H01Q 1/22* (2013.01); *H04N 23/55* (2023.01)

(58) Field of Classification Search
CPC ........ H04N 23/51; H04N 23/55; H04N 23/00; H04N 23/50; H04N 7/185; H04N 23/661; H04N 23/66; H01Q 1/22; H01Q 21/28; H01Q 21/24; H01Q 1/242; H01Q 7/00; H01Q 1/12; H01Q 1/243; H01Q 1/245;
(Continued)

(56) References Cited

U.S. PATENT DOCUMENTS

2008/0198082 A1* 8/2008 Soler Castany ......... H01Q 1/38
343/893
2008/0266189 A1* 10/2008 Wu ........................ H01Q 21/29
343/702

(Continued)

FOREIGN PATENT DOCUMENTS

JP 2006-217174 A 8/2006
JP 2009-094890 A 4/2009

(Continued)

OTHER PUBLICATIONS

Office Action for corresponding Japanese Application No. 2022-187323 issued Jun. 30, 2026 and its English Machine Translation.

*Primary Examiner* — Abdelaaziz Tissire
(74) *Attorney, Agent, or Firm* — Renner, Otto, Boisselle & Sklar, LLP

(57) ABSTRACT

An imaging apparatus includes a housing, an imaging element provided in the housing, a first antenna, a second antenna, an IC chip electrically connected to both the first and second antennas and executing wireless communication via the first and second antennas, and a first circuit board on which the IC chip is mounted. When viewed in a first direction that is a normal direction of a light receiving surface of the imaging element and is a front-rear direction of the housing, the first antenna is arranged at one end portion of the housing in a second direction orthogonal to the first direction, and the second antenna is arranged at the other end portion of the housing in the second direction.

12 Claims, 5 Drawing Sheets

(58) Field of Classification Search

CPC ............ H01Q 1/42; H01Q 13/10; H01Q 1/44; H01Q 13/106; H01Q 13/16; H01Q 19/005; H01Q 21/205; H01Q 21/08; H01Q 1/2275; H01Q 15/14; H01Q 3/04; H01Q 9/30; H01Q 1/24; H01Q 1/246; H01Q 1/27; H01Q 1/362; H01Q 1/38; H01Q 1/48; H01Q 11/08; H01Q 19/09; H01Q 21/29; H01Q 23/00; H01Q 3/24; H01Q 3/2629; H01Q 5/357; H01Q 9/0407; H01Q 9/0421; H01Q 9/0442; H01Q 9/0457; H01Q 9/065; H01Q 9/285

See application file for complete search history.

(56) References Cited

U.S. PATENT DOCUMENTS

| | | | | |
|---|---|---|---|---|
| 2014/0063336 | A1* | 3/2014 | Choi | H04N 23/51 348/374 |
| 2014/0347242 | A1* | 11/2014 | Seo | H01Q 1/48 343/848 |
| 2016/0190709 | A1* | 6/2016 | Niu | H01Q 21/28 343/725 |
| 2016/0301145 | A1* | 10/2016 | Lee | H01Q 1/521 |
| 2017/0171451 | A1* | 6/2017 | Iwasa | H04N 23/51 |
| 2019/0373153 | A1* | 12/2019 | Zeng | H04N 23/57 |
| 2020/0243948 | A1* | 7/2020 | Kim | H01Q 5/385 |
| 2020/0411958 | A1* | 12/2020 | Yan | H04B 7/0413 |
| 2021/0119322 | A1 | 4/2021 | Li | |
| 2022/0043326 | A1* | 2/2022 | Eckman | G03B 17/02 |
| 2022/0200126 | A1* | 6/2022 | Lalinde | H04N 23/45 |
| 2022/0272833 | A1* | 8/2022 | Ishigami | H04N 23/57 |
| 2022/0400547 | A1* | 12/2022 | Aoki | H05K 1/0219 |
| 2023/0155304 | A1* | 5/2023 | Huang | H01Q 1/521 343/893 |
| 2024/0136715 | A1* | 4/2024 | Zhou | H01Q 21/28 |

FOREIGN PATENT DOCUMENTS

| | | | |
|---|---|---|---|
| JP | 2011-120113 | A | 6/2011 |
| JP | 2014-056089 | A | 3/2014 |
| JP | 2015-186056 | A | 10/2015 |
| JP | 2021-526665 | A | 10/2021 |
| WO | WO-2022142598 | A1 * | 7/2022 |

* cited by examiner

IMAGING APPARATUS

BACKGROUND OF THE INVENTION

Field of the Invention

The present disclosure relates to an imaging apparatus.

Description of the Related Art

For example, JP 2006-217174 A discloses an imaging apparatus capable of wireless communication. The imaging apparatus includes a plurality of antennas to perform wireless communication.

SUMMARY OF THE INVENTION

When wireless communication is performed using a plurality of antennas, radio waves transmitted and received by the antennas may interfere with each other.

In view of the above, an object of the present disclosure is to reduce mutual interference of radio waves transmitted and received by a plurality of antennas in an imaging apparatus that performs wireless communication using the antennas.

In order to solve the above problem, according to one aspect of the present disclosure, there is provided an imaging apparatus including:

a housing;

an imaging element provided in the housing;

a first antenna;

a second antenna;

an IC chip electrically connected to both the first and second antennas and configured to execute wireless communication via the first and second antennas; and a first circuit board on which the IC chip is mounted, in which as viewed in a first direction that is a normal direction of a light receiving surface of the imaging element and is a front-rear direction of the housing, the first antenna is arranged at one end portion of the housing in a second direction orthogonal to the first direction, and the second antenna is arranged at another end portion in the second direction of the housing.

According to the present disclosure, in the imaging apparatus that performs wireless communication by using a plurality of antennas, mutual interference of radio waves transmitted and received by the antennas can be reduced.

DESCRIPTION OF THE PREFERRED EMBODIMENT

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy of description below and to facilitate understanding of those skilled in the art.

Note that the inventor(s) provide the accompanying drawings and the description below so that those skilled in the art can fully understand the present disclosure, and do not intend to limit the subject matter described in claims by these drawings and description.

Hereinafter, an imaging apparatus according to an embodiment of the present disclosure will be described with reference to the drawings.

Figure 1:
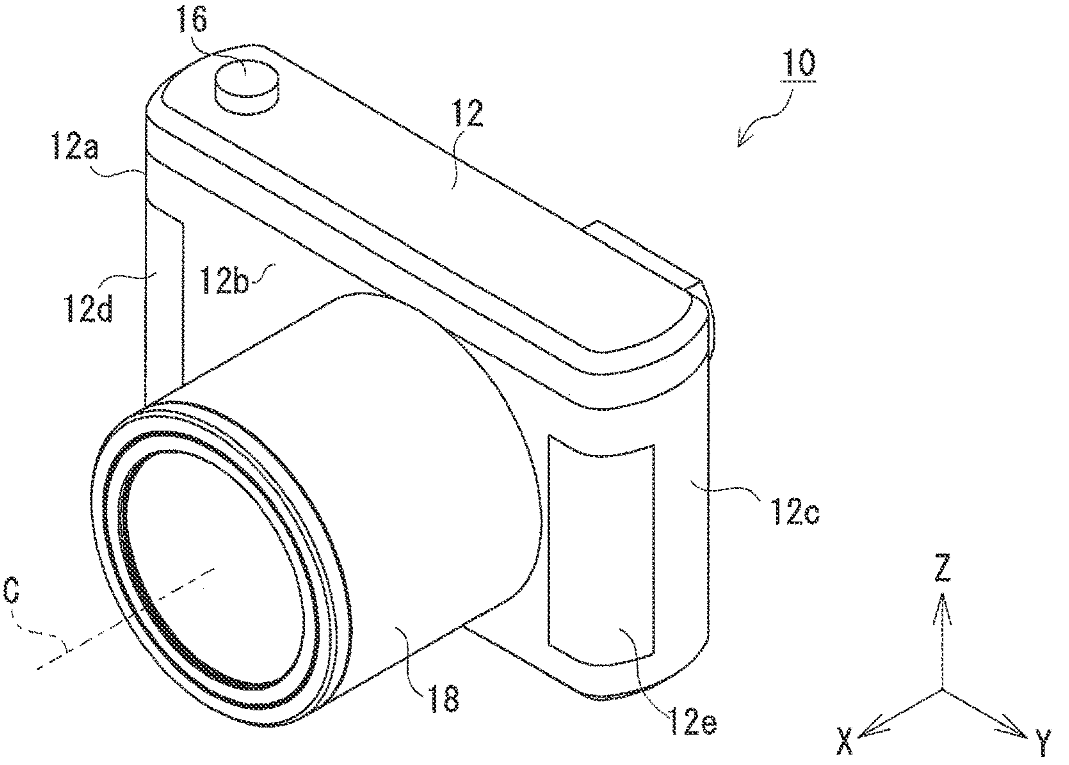
FIG. 1 is a perspective view of an imaging apparatus according to an embodiment of the present disclosure.
Figure 2:
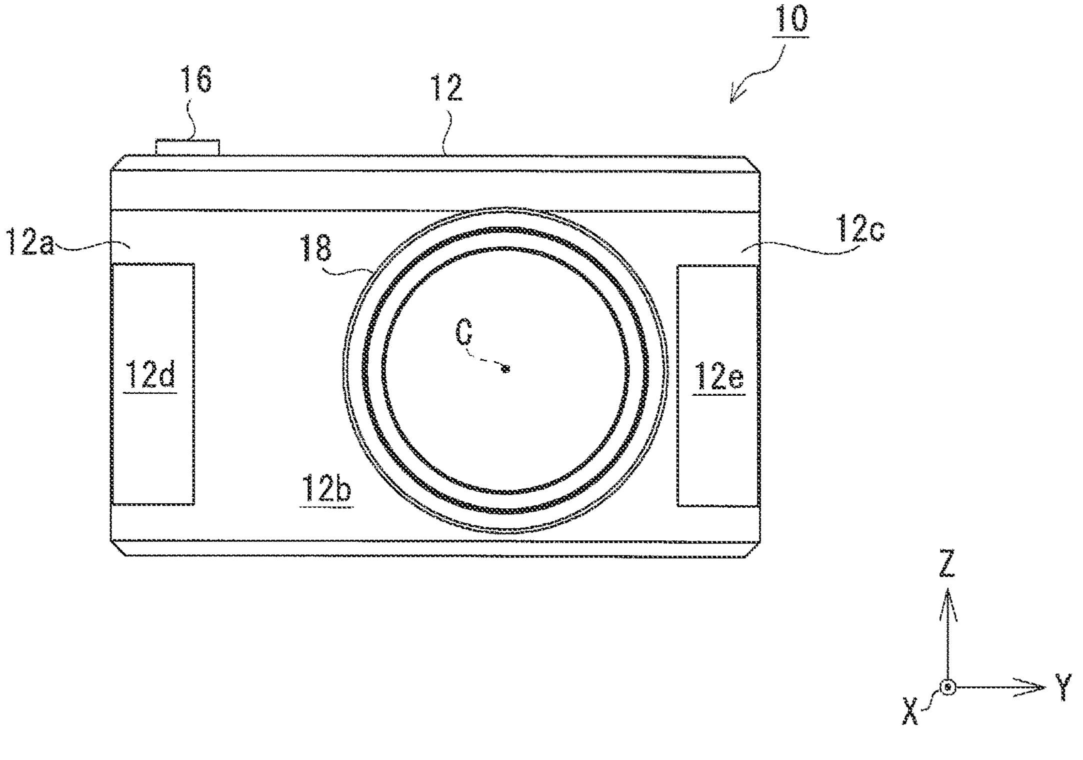
FIG. 2 is a front view of the imaging apparatus.
Figure 3:
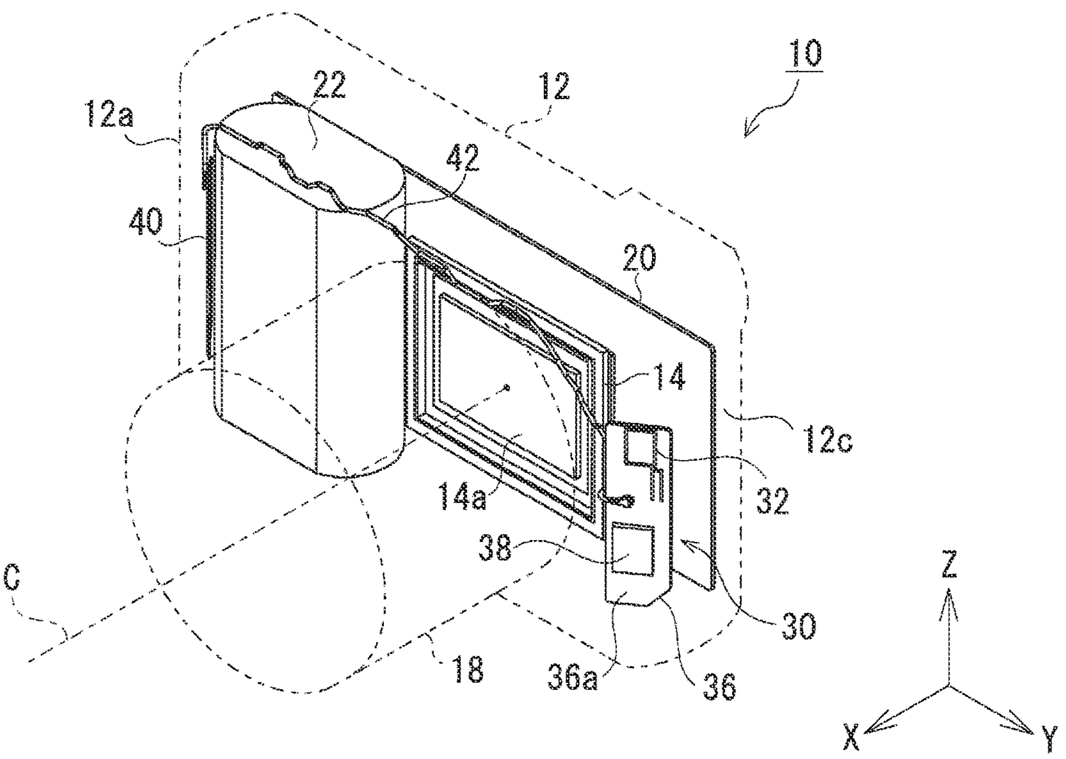
FIG. 3 is a perspective view illustrating an internal structure of the imaging apparatus.
Figure 4:
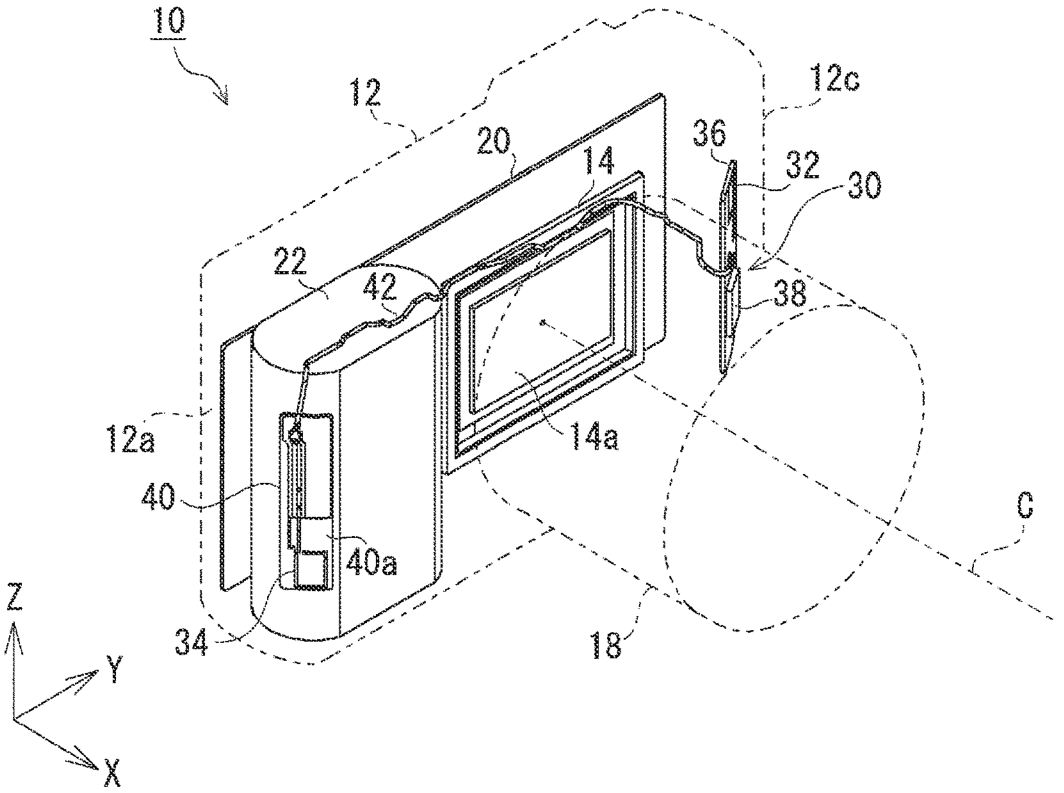
FIG. 4 is a perspective view illustrating an internal structure of the imaging apparatus viewed from a different viewpoint.
Figure 5:
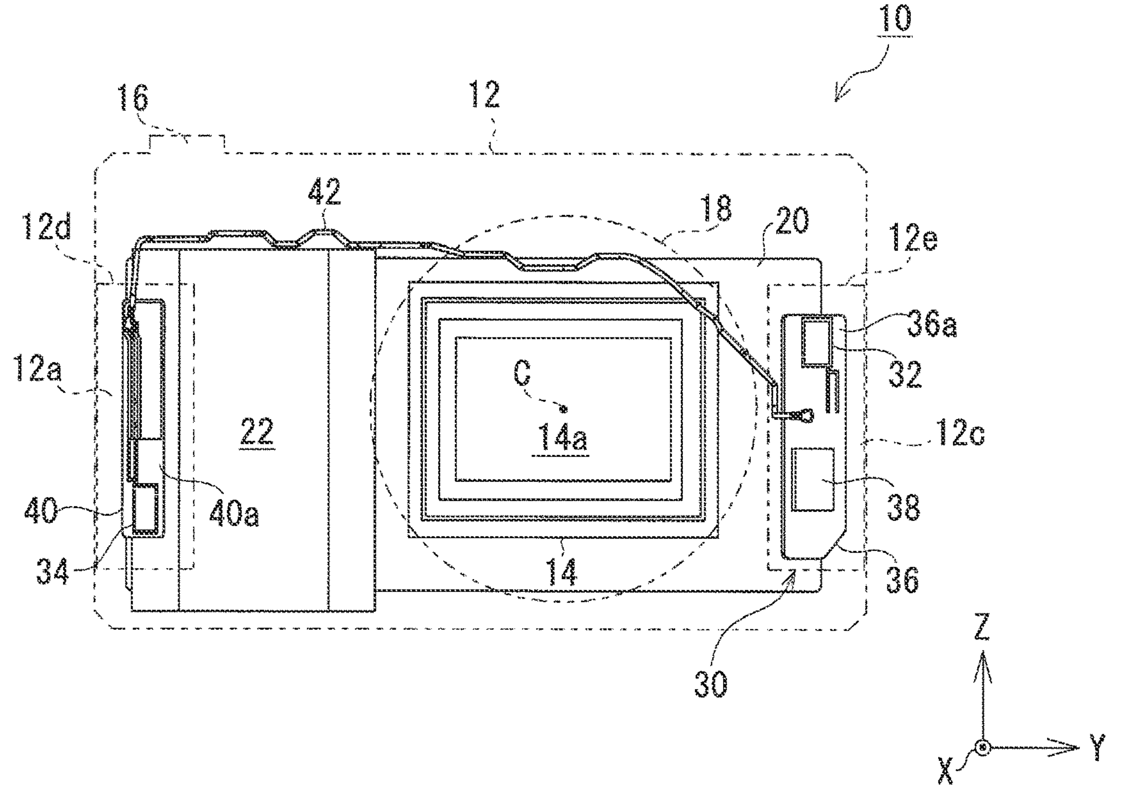
FIG. 5 is a front view illustrating an internal structure of the imaging apparatus.
Figure 6:
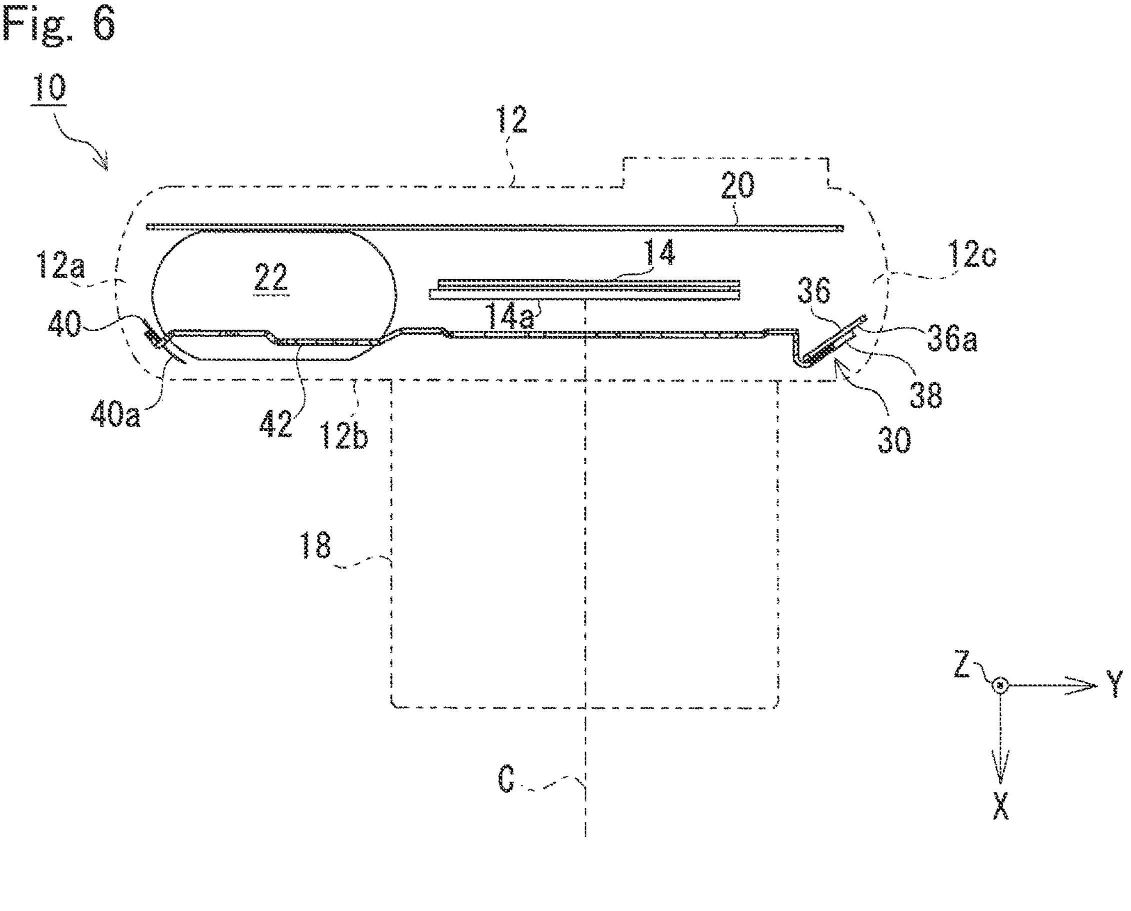
FIG. 6 is a top view illustrating an internal structure of the imaging apparatus.

FIG. 1 is a perspective view of the imaging apparatus according to an embodiment of the present disclosure. FIG. 2 is a front view of the imaging apparatus. Furthermore, FIGS. 3 and 4 are perspective views illustrating an internal structure of the imaging apparatus viewed from different viewpoints. Moreover, FIG. 5 is a front view illustrating an internal structure of the imaging apparatus. FIG. 6 is a top view illustrating an internal structure of the imaging apparatus.

Note that an X-Y-Z orthogonal coordinate system shown in the drawings is for facilitating understanding of an embodiment of the present disclosure, and not for limiting an embodiment of the present disclosure. An X-axis direction (first direction) is a front-rear direction of the imaging apparatus, a Y-axis direction (second direction) is a left-right direction, and a Z-axis direction (third direction) is a height direction. The side on which a subject is present at the time of photographing is the front side of the imaging apparatus, and the right side and the left side of the imaging apparatus are the right side and the left side (in front view) in a case where the imaging apparatus is viewed from the front.

As illustrated in FIGS. 1 to 6, an imaging apparatus 10 according to an embodiment of the present disclosure is an imaging apparatus held only with the right hand or held with both hands, and includes a housing 12 and an imaging element 14 provided in the housing 12. In the case of the present embodiment, a large part of the housing 12 is made of a metal material such as a magnesium alloy. Further, a shutter button 16 is provided in an upper portion of a left end portion **12*a* of the housing 12**.

Further, in the case of the present embodiment, the imaging apparatus 10 includes a lens 18 that is provided on a front surface **12*b* of the housing 12 so as to be located in front of the imaging element 14 and forms an image of a subject on a light receiving surface 14*a* of the imaging element 14. As illustrated in FIG. 5, the lens 18 is arranged between the left end portion 12*a* and a right end portion 12*c* of the housing 12 as viewed in the front-rear direction (X-axis direction) of the imaging apparatus 10. An optical axis C of the lens 18 extends in the front-rear direction (X-axis direction), and passes through the center of the light receiving surface 14***a* while being orthogonal to the light receiving surface 14*a* of the imaging element 14.

Furthermore, in the case of the present embodiment, the imaging apparatus 10 includes a main circuit board (third circuit board) 20 provided in the housing 12 and arranged behind the imaging element 14. A processor such as a CPU, a storage device such as a memory, and the like are mounted on the main circuit board 20.

Moreover, in the case of the present embodiment, the imaging apparatus 10 includes a battery 22 provided in the left end portion 12*a* of the housing 12.

Further, the imaging apparatus 10 includes a wireless communication module 30 in order to perform wireless communication with an external device such as a mobile terminal and a personal computer. Further, the imaging apparatus 10 includes first and second antennas 32 and 34 to transmit and receive a radio wave.

The wireless communication module 30 includes a circuit board 36 (first circuit board) and an IC chip 38 mounted on the circuit board 36 and electrically connected to the first and second antennas 32 and 34. In the case of the present embodiment, the circuit board 36 is provided in the right end portion 12*c* of the housing 12. Further, the circuit board 36 extends in the height direction (Z-axis direction) in a state where a mounting surface 36*a* on which the IC chip 38 is mounted faces obliquely forward and outward.

In the case of the present embodiment, the first antenna 32 is arranged in the right end portion 12*c* of the housing 12. Further, the first antenna 32 is mounted on the circuit board 36. Specifically, the first antenna 32 is an antenna pattern formed on the mounting surface 36*a* of the circuit board 36 and electrically connected to the IC chip 38. Note that a portion 12*e* of the housing 12 that the mounting surface 36*a* of the circuit board 36 faces is made from a material capable of transmitting a radio wave transmitted and received by the first antenna 32, for example, a resin material.

Further, although the reason will be described later, the first antenna 32 is provided at an upper portion of the circuit board 36, that is, at an upper position of the right end portion 12*c* of the housing 12.

In the present embodiment, the second antenna 34 is arranged in the left end portion 12*a* of housing 12. Further, the second antenna 34 is mounted on a circuit board 40 (second circuit board). Specifically, the circuit board 40 is a flexible circuit board, is arranged between the housing 12 and the battery 22, and extends in the height direction (Z-axis direction). The second antenna 34 is an antenna pattern formed on a mounting surface 40*a* of the circuit board 40. The mounting surface 40*a* faces obliquely forward and outward. Note that a portion 12*d* of the housing 12 that the mounting surface 40*a* of the circuit board 40 faces is made from a material capable of transmitting a radio wave transmitted and received by the second antenna 34, for example, a resin material.

Further, although the reason will be described later, the second antenna 34 is provided at a lower portion of the circuit board 40, that is, at a lower position of the left end portion 12*a* of the housing 12.

The circuit board 40 arranged at the left end portion 12*a* of the housing 12 and on which the second antenna 34 is mounted is electrically connected to the circuit board 36 arranged at the right end portion 12*c* of the housing 12 and on which the first antenna 32 and the IC chip 38 are mounted, via a cable 42. The second antenna 34 is electrically connected to the IC chip 38 via the cable 42.

In the case of the present embodiment, the cable 42 is a flexible thin-line-shaped coaxial cable that is easy to arrange. As illustrated in FIGS. 3 to 5, the cable 42 is arranged in the housing 12 so as not to cross the front of the light receiving surface 14*a* of the imaging element 14. Specifically, as viewed in the front-rear direction (X-axis direction) of the imaging apparatus 10, the cable 42 is arranged so as to pass above the imaging element 14. Note that the cable 42 may be arranged so as to pass below the imaging element 14 as viewed in the front-rear direction of the imaging apparatus 10.

Further, in the case of the present embodiment, the cable 42 is arranged in the housing 12 so as to pass the front of the imaging element 14 as viewed in the height direction (Z-axis direction) of the imaging apparatus 10. By the above, a signal flowing through the cable 42 is less likely to be affected by noise generated from the imaging element 14 and the main circuit board 20 (for example, compared to a case where the cable 42 is arranged between the imaging element 14 and the main circuit board 20 as viewed in the height direction). Further, since the cable 42 is a coaxial cable, the cable 42 is hardly affected by noise (compared to a case where the cable 42 is a flexible flat cable or the like).

The configuration of the imaging apparatus 10 according to the embodiment of the present disclosure is described above. Hereinafter, a further feature of the imaging apparatus 10, in particular, a feature related to wireless communication executed by the imaging apparatus 10 will be described.

The wireless communication module 30, that is, the IC chip 38, is configured to execute wireless communication conforming to a predetermined wireless communication standard by using the first and second antennas 32 and 34.

Specifically, a processor mounted on the main circuit board 20 operates according to a program stored in a memory, and executes control on the IC chip 38 of the radio communication module 30. For example, the IC chip 38 controlled by the processor transmits image data, moving image data, and the like stored in a memory to an external device, for example, an external device such as a mobile terminal, a personal computer, or the like via the first and second antennas 32 and 34. Further, for example, the IC chip 38 receives a signal such as a remote operation signal transmitted from an external device such as a mobile terminal via the first and second antennas 32 and 34, and transmits the received data to the processor.

In the case of the present embodiment, the wireless communication module 30, that is, the IC chip 38 is configured to execute wireless communication conforming to a plurality of wireless communication standards. Specifically, the IC chip 38 is configured to execute Bluetooth (registered trademark) communication and Wi-Fi (registered trademark) communication. The former is a wireless communication standard suitable for short-range communication with a relatively small capacity using a frequency of 2.4 GHz band, and the latter is a wireless communication standard suitable for long-range communication with a relatively large capacity using a frequency of 2.4 GHz band, 5 GHz band, or 6 GHz band.

The IC chip 38 of the wireless communication module 30 uses only the first antenna 32 in a case of performing Bluetooth communication.

Further, the IC chip 38 of the radio communication module 30 is configured to execute MIMO (multiple-input multiple-output) communication via both the first and second antennas 32 and 34 in a case where an external device can perform MIMO communication when executing Wi-Fi communication. In MIMO communication, the first and second antennas 32 and 34 simultaneously transmit and receive different signals at the same frequency. This enables large-capacity communication (high-speed communication). In order to perform MIMO communication in an excellent manner, the imaging apparatus 10 of the present embodiment has a feature below.

First, the first and second antennas 32 and 34 are provided in the housing 12 in a state of being separated from each other as much as possible in order to reduce mutual interference of radio waves transmitted and received by the antennas. Specifically, in the case of the present embodiment, as illustrated in FIG. 5, when viewed in the front-rear direction (X-axis direction) of the imaging apparatus 10, the first antenna 32 is arranged at the right end portion 12*c* of the housing 12, and the second antenna 34 is arranged at the left end portion 12*a* of the housing 12. That is, the first and second antennas 32 and 34 are arranged at both end portions in the left-right direction (Y-axis direction) of the housing 12. This is because a size in the left-right direction is the largest among sizes in the front-rear direction, the left-right direction, and the height direction (Z-axis direction) of the housing 12.

Further, as illustrated in FIG. 5, the first antenna 32 is provided at an upper portion of the circuit board 36, that is, at an upper position of the right end portion 12*c* of the housing 12. Further, the second antenna 34 is provided at a lower portion of the circuit board 40, that is, at a lower position of the left end portion 12*a* of the housing 12. In other words, as viewed in the front-rear direction (X-axis direction) of the imaging apparatus 10, the first antenna 32 and the second antenna 34 face each other across the lens 18 in an oblique direction. This is to reduce deterioration in communication quality such as a communication distance and a communication speed of MIMO communication using both the first and second antennas 32 and 34, which is caused by the left hand and the right hand of the user holding the imaging apparatus 10 covering the first and second antennas 32 and 34, respectively.

Specifically, in the imaging apparatus 10 held by both hands, at the time of photographing, the user grips the left end portion 12*a* of the housing 12 with the right hand. Also, user grips the lens 18 or holds the housing 12 so as to sandwich a top surface and a bottom surface of the housing 12, with the left hand. Specifically, the user holds the left end portion 12*a* of the housing 12 in the front-rear direction (X-axis direction) with the palm and three fingers of the right hand except the thumb and the index finger, and places the index finger of the right hand on the shutter button 16 located at an upper portion of the left end portion 12*a*. Further, the user supports the lens 18 so as to wrap the lens 18 from below with the palm and the four fingers of the left hand excluding the thumb, and places the remaining thumb of the left hand along the lens 18. Alternatively, the thumb of the left hand is placed on a bottom surface of the housing 12, and the index finger and the middle finger of the left hand are placed on a top surface of the housing 12.

According to such a way of holding the imaging apparatus 10, unlike the present embodiment, in a case where the first antenna 32 is arranged at a lower position of the right end portion 12*c* of the housing 12, there is a high possibility that the first antenna 32 is covered by a part of the left hand of the user and cannot communicate well. Specifically, the palm of the left hand, in particular, the hypothenar eminence and its periphery come into contact with the housing 12 and cover the entire first antenna 32, and as a result, there is a possibility that the first antenna 32 cannot transmit and receive a radio wave well.

As illustrated in FIG. 5, in the case of the present embodiment, since the first antenna 32 is provided at an upper position in the right end portion 12*c* of the housing 12, there is a low possibility that the first antenna 32 is covered with a part of the left hand of the user and cannot communicate well. In front of the first antenna 32, there may be the thumb or the thenar eminence of the palm of the user's left hand in a case where the thumb or the thenar eminence are placed along the lens 18, but the thumb or the thenar eminence of the left hand does not contact the housing 12. That is, since there is a space through which a radio wave propagates between the thumb or the thenar eminence of the left hand and the first antenna 32, the first antenna 32 can transmit and receive a radio wave in an excellent manner. Further, in the case where the housing 12 is held on a top surface and a bottom surface of the housing 12, the front of the first antenna 32 is not covered, and the first antenna 32 can transmit and receive a radio wave in an excellent manner.

Further, unlike the present embodiment, in a case where the second antenna 34 is arranged at an upper position of the left end portion 12*a* of the housing 12, there is a high possibility that the second antenna 34 is covered with a part of the right hand of the user and cannot communicate well. Specifically, three fingers except the thumb and the index finger of the right hand contact the housing 12 and cover the entire second antenna 34, and as a result, there is a possibility that the second antenna 34 cannot transmit or receive a radio wave in an excellent manner.

As illustrated in FIG. 5, in the case of the present embodiment, since the second antenna 34 is provided at a lower position in the left end portion 12*a* of the housing 12, there is a low possibility that the second antenna 34 is covered with a part of the right hand of the user and cannot communicate well. The second antenna 34 may be partially covered with the little finger of the right hand, but is hardly entirely covered with the right hand. For this reason, the second antenna 34 can transmit and receive a radio wave in an excellent manner.

In a case of MIMO communication using both the first antenna 32 and the second antenna 34, if the transmission and reception capability of one antenna is degraded, MIMO communication itself cannot be performed. Therefore, to perform MIMO communication in an excellent manner when the imaging apparatus 10 is held by both hands of the user (for example, during photographing), the first antenna 32 is provided at an upper position of the right end portion 12*c* of the housing 12, and the second antenna 34 is provided at a lower position of the left end portion 12*a* of the housing 12. By the above, the imaging apparatus 10 can transmit imaging data to an external device while photographing is performed.

According to the present embodiment as described above, in the imaging apparatus that performs wireless communication by using a plurality of antennas, mutual interference of radio waves transmitted and received by the antennas can be reduced.

Although the embodiment of the present disclosure is described above with reference to the above embodiment, the embodiment of the present disclosure is not limited to this.

For example, in the case of the above-described embodiment, the imaging apparatus 10 includes the lens 18 as a constituent. However, the embodiment of the present disclosure is not limited to this. The lens may be an option for the imaging apparatus. In this case, the imaging apparatus includes a lens mount to which a lens is detachably attached.

Further, in the case of the above-described embodiment, each of the first and second antennas 32 and 34 is an antenna pattern formed on the circuit boards 36 and 40. However, the embodiment of the present disclosure is not limited to this. The first and second antennas may be, for example, conductor members.

Furthermore, in the case of the above-described embodiment, the first and second antennas 32 and 34 are arranged at both end portions in the left-right direction (Y-axis direction) of the housing 12 of the imaging apparatus 10. However, the embodiment of the present disclosure is not limited to this. The first and second antennas may be arranged at both end portions in the height direction of the housing. That is, the facing direction of the first antenna and the second antenna is not limited to the left-right direction of the housing as long as the first antenna and the second antenna can be separated from each other as much as possible.

Moreover, in the case of the above-described embodiment, the IC chip 38 is a device capable of performing large-capacity communication, what is called "2×2 MIMO" communication, by simultaneously using both the first antenna 32 and the second antenna 34. However, the embodiment of the present disclosure is not limited to this. An IC chip that executes wireless communication may be, for example, a device that executes what is called "4×4 MIMO" communication that simultaneously uses four antennas.

In addition, in the case of the above-described embodiment, a part of the housing 12 of the imaging apparatus 10 is made of a metal material. In the case where a part of the housing of the imaging apparatus is made of a metal material as described above, a cable of a wireless communication module may be fixed to the part.

Figure 7:
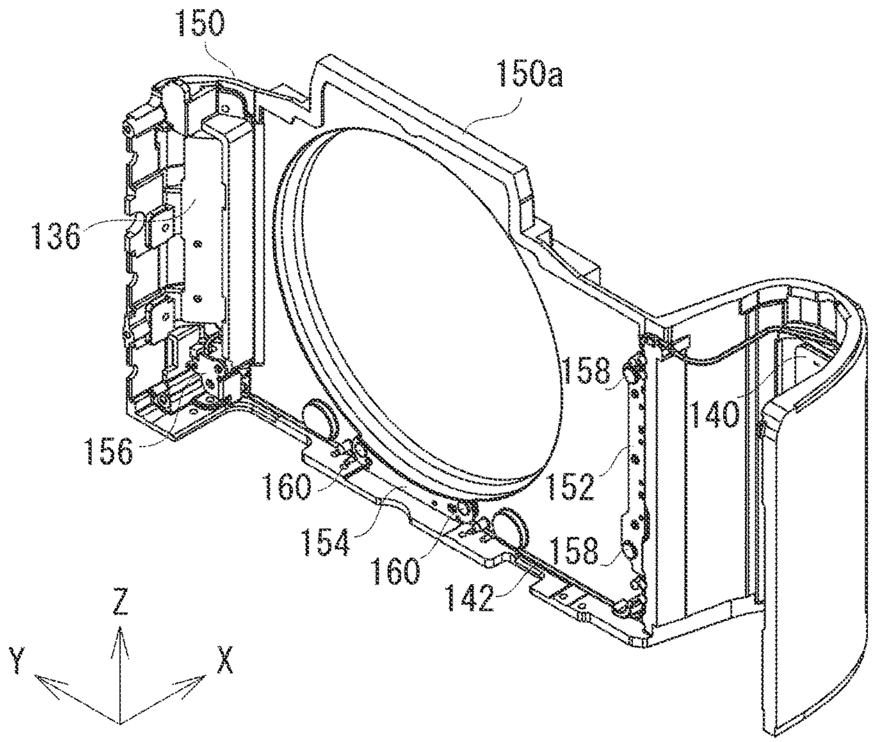
FIG. 7 is a rear perspective view of a housing in a state where a wireless communication module is fixed in the imaging apparatus according to another embodiment.
Figure 8:
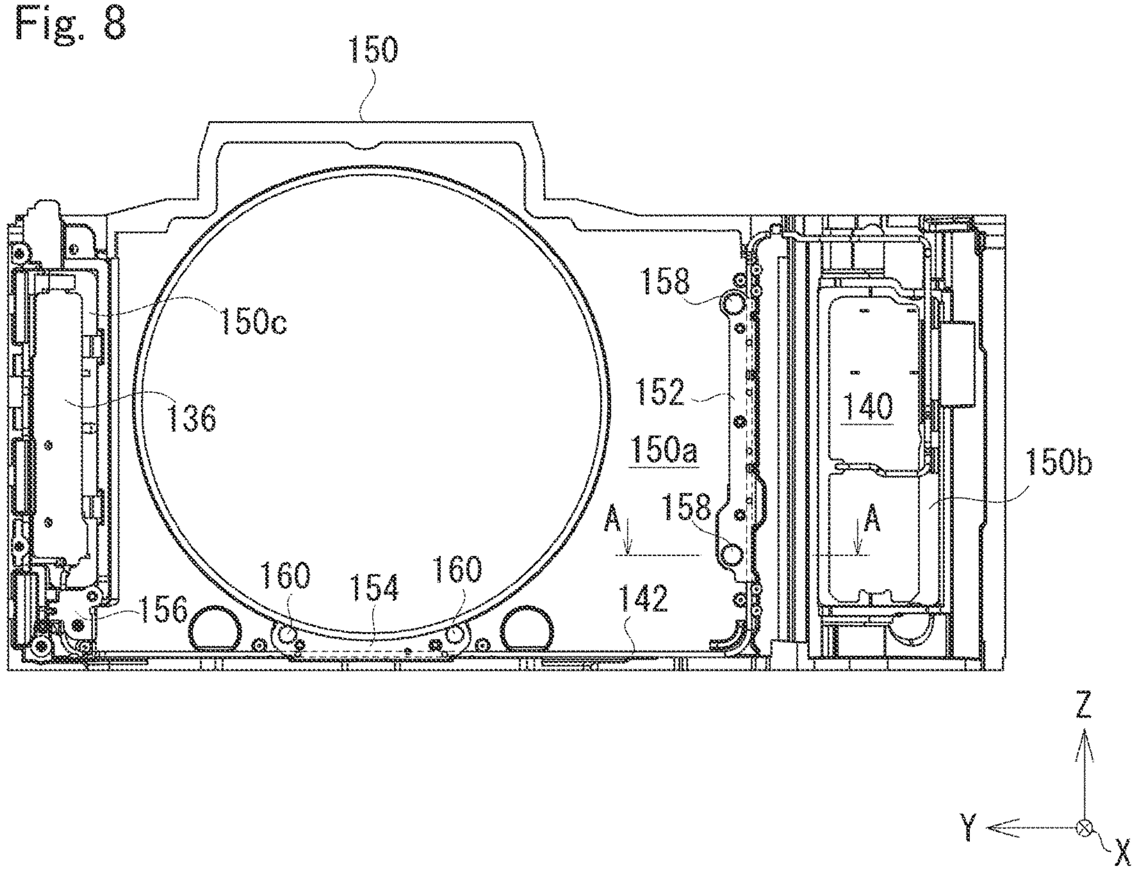
FIG. 8 is a rear view of the housing in a state where the wireless communication module is fixed in the imaging apparatus according to another embodiment.
Figure 9:
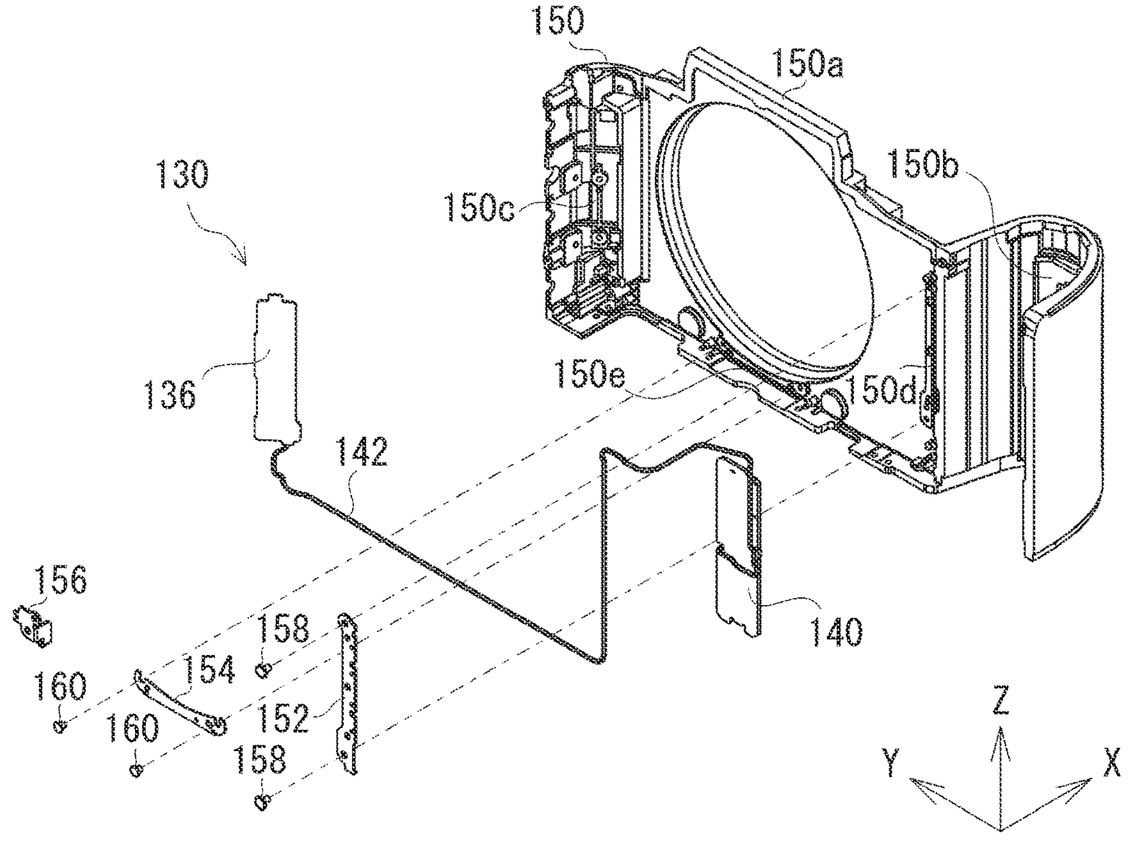
FIG. 9 is a rear perspective view of the housing in a state where the wireless communication module is removed in the imaging apparatus according to another embodiment.
Figure 10:
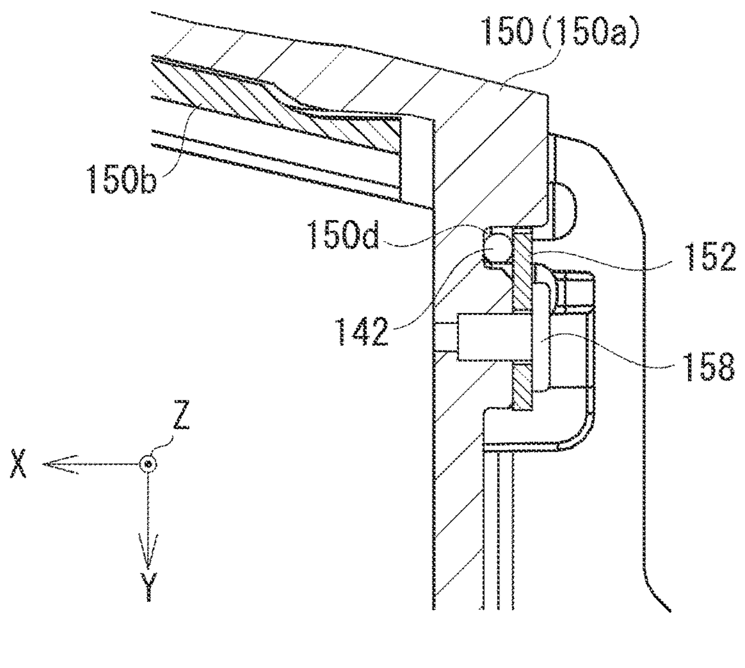
FIG. 10 is a cross-sectional view illustrating fixing of the wireless communication module and the housing.

FIG. 7 is a rear perspective view of a housing in a state where a wireless communication module is fixed in the imaging apparatus according to another embodiment. Further, FIG. 8 is a rear view of the housing in a state where the wireless communication module is fixed in the imaging apparatus according to another embodiment. Furthermore, FIG. 9 is a rear perspective view of the housing in a state where the wireless communication module is removed in the imaging apparatus according to another embodiment. FIG. 10 is a cross-sectional view illustrating fixing of the wireless communication module and the housing. Note that, in FIGS. 7 to 10, the housing is not entirely illustrated, and only a front casing 150 constituting a front side portion of the housing is illustrated.

An imaging apparatus according to another embodiment includes a wireless communication module 130 that is substantially the same as the wireless communication module 30 in the imaging apparatus 10 according to the above-described first embodiment illustrated in FIGS. 1 to 6. FIG. 10 is the cross-sectional view along a line A-A shown in FIG. 8.

In the imaging apparatus according to another embodiment, a circuit board 136 (first circuit board) in the wireless communication module 130 is provided in a right end portion in the housing, that is, provided on the back side of a right end portion of the front casing 150. Further, a circuit board 140 (second circuit board) in a wireless communication module 130 is provided in a left end portion in the housing, that is, provided on the back side of a left end portion in the front casing 150.

Note that, in the imaging apparatus according to another embodiment, the front casing 150 includes, for example, a main body portion 150*a* made from a metal material such as a magnesium alloy, and portions 150*b* and 150*c* made from a resin material. The circuit board 136 (first circuit board) and the circuit board 140 (second circuit board) are attached to each of the portions 150*b* and 150*c* made from a resin material.

In the imaging apparatus according to another embodiment, a cable 142 electrically connecting the circuit boards 136 and 140 is a conductive wire (for example, a coaxial cable) covered with an insulating material, and is fixed to the main body portion 150*a* of the front casing 150 made from a metal material. By the above, impedance between the circuit boards 136 and 140 is stabilized at a specific frequency.

Specifically, the main body portion 150*a* of the front casing 150 is a portion touched by the user, and thus is substantially grounded (substantially has ground potential). In a case where the cable 142 is not fixed to the main body portion 150*a* of the front casing 150, a distance between the main body portion 150*a* and the cable 142 varies, and impedance between the circuit boards 136 and 140 varies at a specific frequency or a specific frequency band. As a result, a communication characteristic, for example, a communicable distance, of the wireless communication module 130 of each of a plurality of imaging apparatuses varies.

As a countermeasure, the imaging apparatus according to another embodiment includes a plurality of cable fixing members 152, 154, and 156 in order to fix the cable 142 to the main body portion 150*a* of the front casing 150.

Each of a plurality of the cable fixing members 152, 154, and 156 has a different shape, and is made from a material having conductivity. For example, the cable fixing members 152, 154, and 156 are made from stainless steel. Further, a plurality of the cable fixing members 152, 154, and 156 are fixed to the front casing 150 such that the cable 142 is sandwiched between these and the main body portion 150*a* of the front casing 150. Furthermore, each of a plurality of the cable fixing members 152, 154, and 156 is electrically connected to the main body portion 150*a* of the front casing 150.

For example, the cable fixing members 152 and 154 are fixed to the main body portion 150*a* of the metal front casing 150 via fixing screws 158 and 160 made from metal. The cable fixing members 152, 154, and 156 are in direct contact with the main body portion 150*a* of the front casing 150. As a result, the cable fixing members 152, 154, and 156 are electrically connected to the main body portion 150*a* of the front casing 150. Note that the term "electrically connected" as used herein means that a plurality of conductors are connected in a direct current manner.

Further, grooves 150*d* and 150*e* for positioning the cable 142 are formed in the main body portion 150*a* of the front casing 150. The cable fixing members 152 and 154 contact a portion of the cable 142 in a state of being arranged in the grooves 150*d* and 150*e*.

According to the fixing of the cable 142 to the main body portion 150*a* of the front casing 150, a distance between the cable 142 and the main body portion 150*a* of the front casing 150 at ground potential is made constant, and variation in impedance between the circuit boards 136 and 140 is reduced. As a result, variation in a communication characteristic of the wireless communication module 130 of each of a plurality of imaging apparatuses is reduced.

Further, a portion of the cable 142 fixed by the cable fixing members 152, 154, and 156 is surrounded by the main body portion 150*a* of the front casing 150 made from metal and the cable fixing members 152, 154, and 156 made from metal. That is, these portions of the cable 142 are shielded. As a result, electromagnetic compatibility (EMC) measures are taken for these portions of the cable 142.

Note that the cable fixing members 152, 154, and 156 do not cover the cable 142 entirely. A portion of the cable 142 not covered with the cable fixing members 152, 154, and 156 may be fixed to the main body portion 150*a* of the front casing 150 via a noise reduction sheet (not illustrated). The noise reduction sheet is a sheet-like composite magnetic material, and is, for example, a resin sheet in which micron-order metal magnetic powder is dispersed. The noise reduction sheet is more easily deformed than the cable fixing members 152, 154, and 156, and can be adhered to the main body portion 150*a* having a complicated shape with a double-sided tape. By the above, EMC measures are further taken for the cable 142.

Furthermore, the cable fixing members 152, 154, and 156 may be omitted as long as the cable 142 can be reliably and continuously fixed to the main body portion 150*a* of the front casing 150 by the noise reduction sheet. That is, the noise reduction sheet may be adhered to a main body portion of the front casing 150 in a state where the entire cable 142 is interposed.

That is, in a broad sense, the imaging apparatus according to the embodiment of the present disclosure is an imaging apparatus including a housing, an imaging element provided in the housing, a first antenna, a second antenna, an IC chip electrically connected to both the first and second antennas and configured to execute wireless communication via the first and second antennas, and a first circuit board on which the IC chip is mounted. As viewed in a first direction that is a normal direction of a light receiving surface of the imaging element and is a front-rear direction of the housing, the first antenna is arranged at one end portion of the housing in a second direction orthogonal to the first direction, and the second antenna is arranged at another end portion in the second direction of the housing.

As described above, the above embodiment is described as an example of the technique in the present disclosure. For this purpose, the drawings and the detailed description are provided. Therefore, the constituent elements described in the drawings and the detailed description include not only constituent elements essential for solving the problem but also constituent elements that are not essential for solving the problem in order to exemplify the technique. Therefore, it should not be immediately recognized that these non-essential constituents are essential based on the fact that these non-essential constituents are described in the drawings and the detailed description.

Further, since the above embodiment is for exemplifying the technique of the present disclosure, various changes, replacements, additions, omissions, and the like can be made within the scope of claims or a scope equivalent to the scope of claims.

The present disclosure is applicable to an imaging apparatus that performs wireless communication.

What is claimed is:

1. An imaging apparatus comprising:
- a housing;
- an imaging element provided in the housing;
- a first antenna;
- a second antenna;
- an IC chip electrically connected to both the first and second antennas and configured to execute wireless communication via the first and second antennas and configured to be capable of executing MIMO communication; and
- a first circuit board on which the IC chip is mounted,
- a lens that is arranged between a right end portion and a left end portion of the housing as viewed in a first direction that is a front-rear direction of the housing orthogonal to a left-right direction of the housing and forms an image of a subject on a light receiving surface of the imaging element, and
- a shutter button provided in an upper portion of the left end portion of the housing,
- wherein as viewed in the first direction that is a normal direction of a light receiving surface of the imaging element, the first antenna is arranged at an upper portion of the right end portion of the housing, and the second antenna is arranged at a lower portion of the left end portion of the housing.

2. The imaging apparatus according to claim 1, further comprising: a second circuit board provided in the left end portion of the housing; and a cable that electrically connects the first circuit board and the second circuit board, wherein the first circuit board is provided in the right end portion of the housing, the first antenna is mounted on the first circuit board, and the second antenna is mounted on a second circuit board.

3. The imaging apparatus according to claim 2, wherein the cable is arranged in the housing so as to pass above or below the imaging element as viewed in the first direction.

4. The imaging apparatus according to claim 2, further comprising a third circuit board provided in the housing and arranged behind the imaging element,
- wherein the cable is arranged to pass in front of the imaging element as viewed in a third direction orthogonal to both the first and second directions.

5. The imaging apparatus according to claim 2, wherein a portion of the housing is made from a metal material,
- the imaging apparatus further comprising a cable fixing member that has electrical conductivity and is fixed to the housing so that the cable is sandwiched between the cable fixing member and the portion of the housing made from a metal material and so as to be electrically connected to the portion of the housing.

6. The imaging apparatus according to claim 2, wherein the cable is a thin-line-shaped coaxial cable.

7. An imaging apparatus comprising:
- a housing;
- an imaging element provided in the housing;
- a first antenna;
- a second antenna;
- an IC chip electrically connected to both the first and second antennas and configured to execute wireless communication via the first and second antennas and configured to be capable of executing MIMO communication; and
- a first circuit board on which the IC chip is mounted,
- a mount for detachably attaching a lens that is arranged between a right end portion and a left end portion of the housing as viewed in a first direction that is a front- rear direction of the housing orthogonal to a left-right direction of the housing and forms an image of a subject on a light receiving surface of the imaging element, and
- a shutter button provided in an upper portion of the left end portion of the housing,
- wherein as viewed in the first direction that is a normal direction of a light receiving surface of the imaging element, the first antenna is arranged at an upper portion of the right end portion of the housing, and the second antenna is arranged at a lower portion of the left end portion of the housing.

8. The imaging apparatus according to claim 7, further comprising:

a second circuit board provided in the left end portion of the housing; and a cable that electrically connects the first circuit board and the second circuit board, wherein the first circuit board is provided in the right end portion of the housing, the first antenna is mounted on the first circuit board, and the second antenna is mounted on a second circuit board.

9. The imaging apparatus according to claim 8, wherein the cable is arranged in the housing so as to pass above or below the imaging element as viewed in the first direction.

10. The imaging apparatus according to claim 8, further comprising a third circuit board provided in the housing and arranged behind the imaging element, wherein the cable is arranged to pass in front of the imaging element as viewed in a third direction orthogonal to both the first and second directions.

11. The imaging apparatus according to claim 8, wherein a portion of the housing is made from a metal material, the imaging apparatus further comprising a cable fixing member that has electrical conductivity and is fixed to the housing so that the cable is sandwiched between the cable fixing member and the portion of the housing made from a metal material and so as to be electrically connected to the portion of the housing.

12. The imaging apparatus according to claim 8, wherein the cable is a thin-line-shaped coaxial cable.

* * * * *